United States Patent Office 3,730,881
Patented May 1, 1973

3,730,881
WASTE WATER TREATMENT SYSTEM
Edward T. Armstrong, 490 Pepperidge Tree Terrace,
Butler, N.J. 07405
Continuation-in-part of application Ser. No. 813,382, Feb. 28, 1969, now Patent No. 3,549,528, dated Dec. 22, 1970, which is a continuation-in-part of abandoned application Ser. No. 362,118, Apr. 23, 1964. This application Dec. 21, 1970, Ser. No. 100,333
Int. Cl. C02c 1/08
U.S. Cl. 210—6
24 Claims

ABSTRACT OF THE DISCLOSURE

The invention represents a new concept in liquid processing particularly in sewage treatment utilizing air, oxygen or a carrier gas with ozone as an attenuator of anaerobic biota, for generalized disinfection, for aeration, or for oxygenation. Essentially, unique designs and/or processes are incorporated into the conventional settling tanks associated with sewage treatment, as well as in the bioprocesses, activated sludge or trickling filter operations. The structural improvements in settling reduce velocity, inhibit boundary layer separation and act to suppress mixing of the sewage to greatly enhance solid and fluid separation, while in the bioprocessing operations, the key is to improve efficiency of the liquid-gas exchange whereby much better oxygen contact is achieved. The liquid-gas exchange feature utilizes a high momentum exchange under turbulent flow conditions in a hydraulic pressure gradient to achieve intimate mixing of the desired gas in the fluid so as to achieve the desired very reliable and efficient liquid-gas exchange.

This application is a continuation-in-part of my earlier application Ser. No. 813,382 filed Feb. 28, 1969, now Pat. No. 3,549,528, issued Dec. 22, 1970, which in turn is a continuation-in-part of application Ser. No. 362,118 filed Apr. 23, 1964 and now abandoned.

Presently, Federal and State legislation focus intensified attention on the need for a reversal in the trend towards complete degradation of the water supply resources of the United States. A concurrent tight supply of funds highlights need for economy. The consensus of specialists in the fields of sanitary engineering and public health appears to be that the existing criteria and acceptable minimum requirements for effluent quality bear heavily on the present state of the art in sanitation systems. So severe is the pressure that it would seem to require a breakthrough in technology in contrast with mere improvements in present techniques. This invention shows how the present art and practice can be upgraded to satisfy needs with what may or may not truly be termed a breakthrough.

The foregoing background information explicitly indicates the nature of the water pollution suppression problem. The general object of the invention is to achieve a marked advance in sanitary engineering practices such that current and anticipated future minimal pollution criteria may be exceeded. The specific objects of the invention are to provide a sanitation system that is technically and economically feasible, adaptable to existing equipment and facilities, and in compliance with conservation policies and effluent quality criteria.

A further object of the invention is to provide a sanitation system which utilizes gases such as air, oxygen or ozone under new concepts of liquid-gas exchange to be competitive with current equipment, materials and systems, and yet much more effective.

A further object of the invention is to provide a novel concept in settling tank and bioprocessing technology for independent application or application in conjunction with a novel liquid-gas exchange technique applied in disinfection.

A further object of the invention is to incorporate a balanced system concept into bioprocessing technology to make the most efficient use of the equipment under optimum operating conditions.

For a better understanding of the invention reference should be had to the accompanying drawings wherein.

Definition of terms pseudomonas, alcaligenes, flavobacterium, micrococcus and enterobacteriaceae Activated sludge.—All types of bacteria make up activated sludge, however, in usual operation obligate anaerobes will attenuate in number in response to the presence of air. A proteinaceous waste will favor alcaligenes, flavo bacterium and bacillus. A carbohydrate waste will proliferate pseudomonas as well.

Anaerobic digesters.—The anaerobic digester bacteria include facultative and obligate anaerobes in active metabolism. Dormant aerobic forms may be present, such as spores of fungi. Acid formers are predominantly facultative forms although a few obligate anaerobes have metabolic end products which are acid.

Methane formers are obligate anaerobes, methanobacterium, methanosarcma and methanococcus in the metabolic pathway to subsequent end products where methane is a precursor, the pathway can be intersected owing to the implied vulnerability of methane formers to oxygen, oxygen-ozone or air. Thus, selective disinfection provides a means to inhibit methane formation or to deny a metabolic pathway to succeeding end products where methane is the necessary precursor. With denial of a pathway, an alternative pathway may be stimulated by changing environmental conditions such as an aerobic activity. In this way methane would not be formed. The source material, carbon dioxide would not be reduced. This is an unnecessary step in waste treatment, since carbon dioxide is a stable end product of aerobic treatment. The hydrogen involved would not be acted upon. It is probably a constituent of formic or acetic acid. Thus, the alternative metabolic pathway opened is that for aerobic microbiological decomposition of acetic acid. Instead of the anaerobic sequence acetic acid, acetoacetic acid to acetone acid isopropanol or to butyric acid and butanol, this invention develops the aerobic sequence. It is: acetic acid, possible pyruvic acid, oxalacetate, citrate and the citric acid (Krebs) cycle to terminal oxidation.

In a similar way, the anaerobic reduction of sulfates by the obligate anaerobic, desulforibrio can be inhibited. Shifting to an aerobic environment denies a pathway to hydrogen sulfide. It has been found that this is readily achieved practically by aeration. Consequences include a marked reduction in objectionable odor and long persistence of aerobic action. The latter case is demonstrable by unexpectedly deferred methylene blue stability tests indicating a shift to products of anaerobic metabolism.

MICROORGANISMS IN WASTE TREATMENT

Trickling filter.—Filter microorganisms reflect the facultative nature of the filter. Predominant are bacteria; aerobic, facultative and anaerobic. Obligate aerobic spore formers bacillus are easily found in the upper, aerobic plaques. The obligate anaerobe, desulforibrio can be found in lower levels at the plaque-stone interface where, in usual practice, DO is zero. The majority of bacteria are facultative, living aerobically until DO zeros, then anaerobically.

Figure 1:
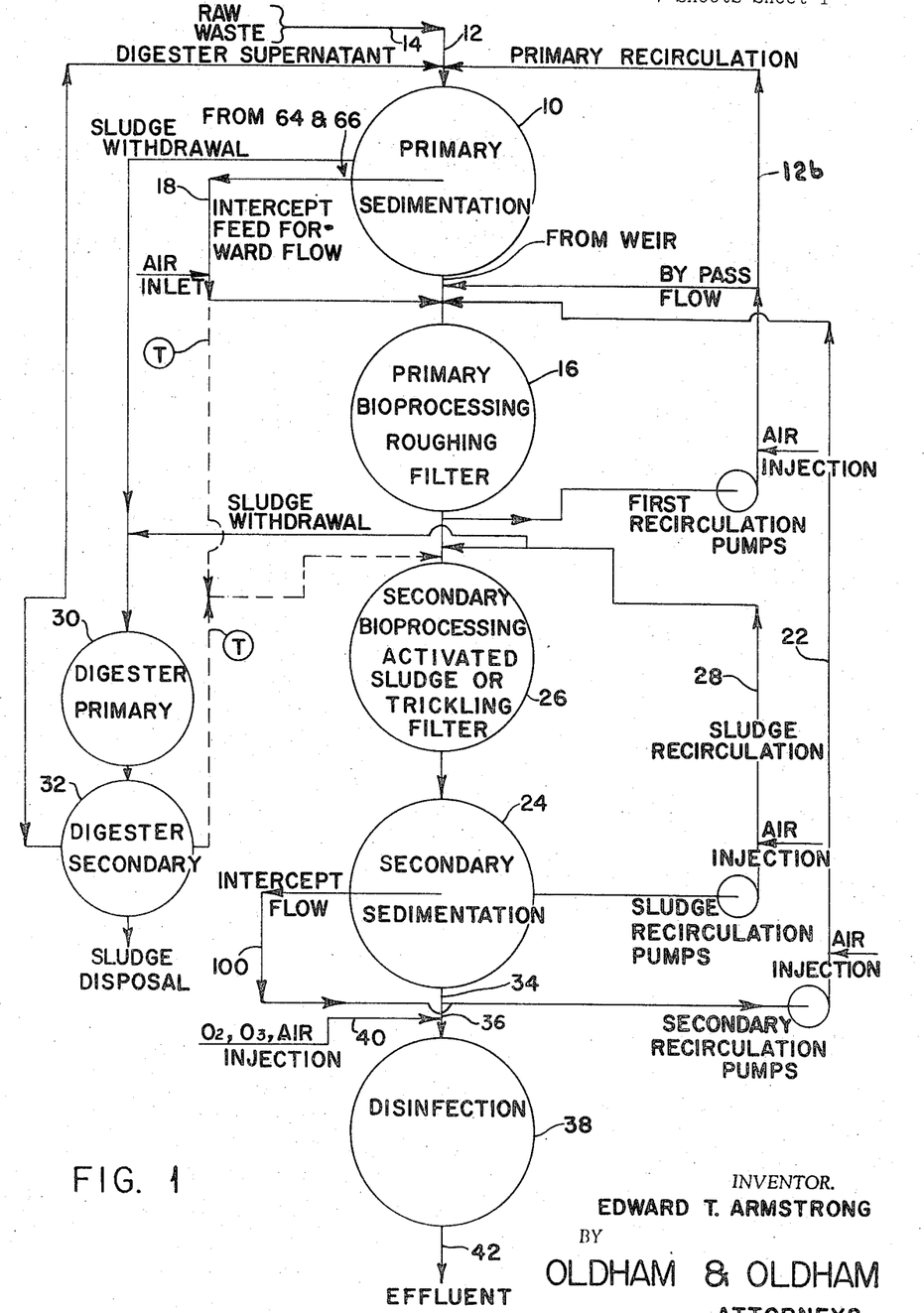
FIG. 1 is a block diagram, schematic illustration of the newly proposed system in total showing flow arrangements and the stages involved.

With reference to the drawings, FIG. 1 illustrates the waste treatment equipment, process and overall system of unit operations in which the invention operates. A primary sedimentation tank is indicated by numeral 10. The tank 10 receives comminuted raw waste including settleable solids from a line 12 issuing from a main line 14. A multiplicity of such lines 12 and subsequent operations may exist.

Two other flows are introduced from the operations which follow, constituting feedback of digester supernatant line 12a and a primary recirculation line 12b. The supernatant fraction is waste having high organic loading, relatively low flow, and it is resistant to aerobic processing for two reasons. First, it presents a biotal population adapted to anaerobic digestion and second, its organic composition includes the products of anaerobic metabolism.

The second fraction of flow is the primary recirculation usually occurring at rates in the range of one half to three times the raw waste rate. This recirculation flow is characterized by low organic loading and a high degree of treatability in an aerobic process. It exerts dilution effects on the raw waste which are not only marked, but which may be used in conjunction with secondary recirculation to great advantage in smoothing hydraulic and organic loading, as discussed later.

These three flows are impressed upon primary sedimentation. Regulatory authorities often stipulate hydraulic design criteria for sedimentation equipment in terms of the tank overflow rate which prevails for the composite flow. Such overflow rates may be affected by the technique illustrated in FIG. 1 of intercepting a portion of flow to be fed forward to bioprocessing indicated by numeral 16. As discussed latter, in settling, using feed forward techniques, additional benefits accrue for example in organic load smoothing.

The basic flow from primary sedimentation 10 proceeds to a primary stage of bioprocessing 16. A roughing trickling filter is illustrative. There, to the sedimented basic flow, three component flows may be added. One 18 is the feed forward intercept flow noted previously. The second 20 is the bypassing fraction of primary recirculation. The third 22 is the secondary recirculation shown in FIG. 1. The existence of the feedback flows, the feed- forward flow and the basic influent flow prior to bioprocessing is important. This combination provides sufficient degrees of freedom to enable independent regulation in this and succeeding operations of hydraulic and organic loading with some flexibility and without overloading primary sedimentation. From the bioprocessing operation 16, such as the roughing filter shown, in most cases, existing plant flow proceeds to secondary sedimentation 24. In some instances, a second stage of bioprocessing 26 may be present. Usually this would be a finishing trickling filter. Rarely, but preferably, it would be an activated sludge stage of bioprocessing.

In this instance, as shown in FIG. 1, from the first stage of bioprocessing 16, the flow is split, with primary recirculation over line 12b withdrawing a fraction for feedback to an earlier stage of processing 10. The remaining fraction proceeds to the second stage of bioprocessing 26. Before introduction to bioprocessing 26, such as to the activated sludge operation, it may be mixed with recirculating activated sludge from line 28.

A remaining portion of the recirculating activated sludge is discharged for digestion with the primary sedimentation tank sludge in a primary digester 30 and secondary digester 32.

From the activated sludge operation 26, the flow proceeds to secondary sedimentation 24. The regulatory authorities stipulation on overflow rate again prevails; however, the permissible overflow rate for secondaries 24 may differ for those from primaries and may further depend upon the type of bioprocessing operation involved. The activated sludge operation is characterized by high rates of recirculation over line 22 of sedimented sludge as suggested in FIG. 1.

From the secondary sedimentation operation 24, flow may be intercepted for feedback recirculation over line 22 after partial sedimentation. A second fraction of fully sedimented flow may be returned in the basic secondary recirculation by line 34. The remaining fully sedimented flow proceeds to disinfection over line 36. In the disinfection unit 38 operation, in-line gas-liquid disinfection over line 40 by injection may precede the conventional contact chamber disinfection. The technique of gas injection is more fully defined hereinafter. The same, or complementary disinfectants may be used. For example, in-line ozonation might be followed by contact chamber chlorination in unit 38. Alternatively, chlorination may occur in both stages or only in the contact chamber with no in-line disinfection. Disinfection yields the final effluent over line 42.

It has been shown in FIG. 1 that sludge is removed from waste at successive stages of waste treatment. The sludge is stabilized, usually in two-stage anaerobic digesters 30 and 32. From the digester 32, stabilized sludge may be discharged to drying on beds, in a kiln, fluidized bed reactor or on a vacuum dewatering drum. Ultimate disposition of solids products may be land fill or incineration. Disposition of digester supernatant over line 12a has been noted previously. It is this overall framework of unit operations within which the concepts proposed by the invention must be implemented. Discussion will now proceed in terms of each of the unit operations described. A final section will deal with optimum systems integration.

SETTLING

Settling or sedimentation is a standard unit operation in waste treatment. The effectiveness of this operation is essential because of the high concentration and broad size range of the particles present in sewage. The concentration of these particles falls in a size classification from a diameter of 0.000001 to 5.0 millimeters. This is an important characteristic, since it affects the settling velocities upon which sedimentation or clarification depend. The significant velocities range upwards from a lower limit of $10^{-9}$ millimeters per second. These velocities are achieved in clarification or settling in sewage treatment and are of primary interest owing to their broad range and extremely low magnitude.

The importance of this from a practical standpoint is in the degree of momentum exchange, vorticity, or of turbulence which will degrade settling or clarification processes. Obviously, it is any level of velocity which approaches the settling velocities described. The significant implication of this, of course, is in the fact that the kinetic energy which is present at the influent to the sedimentation chamber should be reduced to the lowest possible practical level. Anything which tends to increase the kinetic energy of the influent jet will degrade the performance of the clarification or sedimentation process. Recirculation has such effects, however, it has offsetting compensatory advantages in diluting the organic load to be handled. In contrast, high velocity, or excessive momentum exchange impose a penalty without an offsetting advantage.

Figures 2, 3:
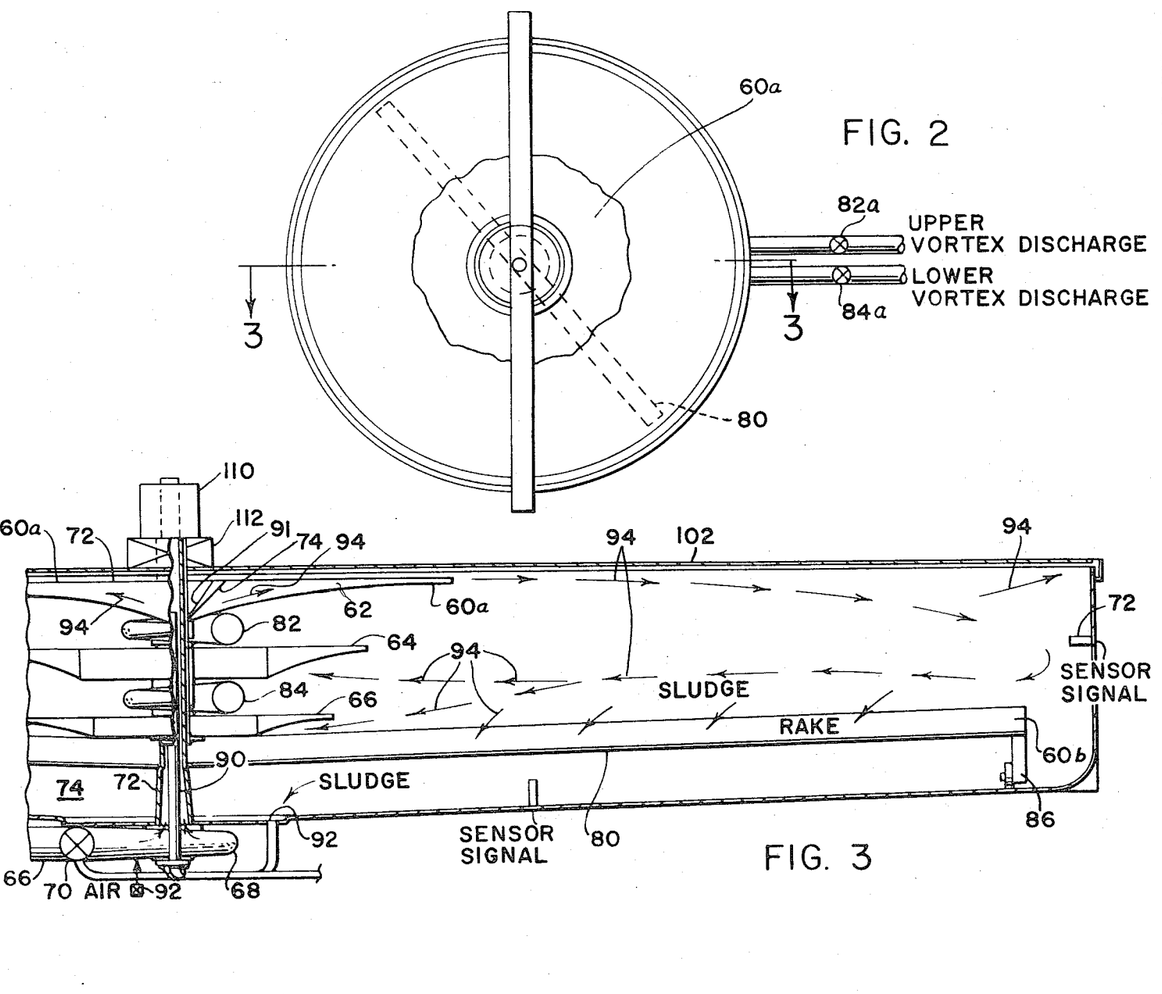
FIG. 2 is a plan view of an improved settling tank comprising one of the stages in the system.
FIG. 3 is a cross-sectional view of the settling tank of FIG. 2 taken on line 3—3 thereof.

For an understanding of the basic construction of the settling tanks 10 and 24, reference should be had to FIGS. 2 and 3 of the drawings. The specific effects of the modifications of the settling chamber are as follows:

(a) To control the fluid path prior to free settling.
(b) To reduce the velocity and turbulence level at the influent to the region of free settling.
(c) To increase the settling flow path length and the time available for settling.
(d) To increase the functional effectiveness of settling.
(e) To reduce, by forward-feed techniques, the hydraulic load on the settling tank and particularly to reduce its overflow rate.
(f) To introduce a further degree of freedom in hydraulic and organic load existing in present feedback recirculation.

The apparatus making up the improved settling tank of the invention may be fitted in a conventional circular settling tank. Its distinguishing element is a rotationally-transformed radial or hyperboloidal-envelope diffuser. The diffuser may incorporate spiral vanes indicated generally by numeral 60. The rotational transformation is through 7° or less to ensure minimum probability of flow separation at the channel boundary. This is a critical factor in the three-dimensional diffuser design owing to the flow deceleration which is induced.

Smaller, but similar, three-dimensional spiral-shaped nozzles 62 and 64 are used at one or more centrally located annular collection points to provide upper effluent collection and/or intermediate effluent collection, respectively. There, flow is accelerating and boundary layer separation is much less significant.

In a conventional sedimentation tank, influent and effluent flow may be distinguished. Previously and in existing art, these have not been considered in terms of optimum overall circulation. The case is illustrated by the conventional circular plan view sedimentation tank. In it, flow is usually upward in a central influent well. At the upper limit of this central well, flow is predominantly radially outward with both relatively high turbulence and velocity.

In such a tank, the predominantly radially directed surface jet induces a circulation in the central region. In consequence, a sustained toroidal vortex circulation develops there. This means that the intended settling flow is perturbed. It is degraded functionally by rotational mixing usually impored mechanically and gravitationally by earth rotation. The result is settling circulation.

Concurrently, the outflow is predominantly a peripheral, radial flow. It induces a similar toroidal vortex at the overflow weir. This toroid exhibits comparably lower velocities, lower turbulence and a much larger diameter. This circulation is of lower energy level corresponding to the reduced overflow velocity. The direction, or sense of rotation, in the second toroidal vortex is the same as in the influent circulation. This means that at an intermediate radial position in the tank, the two toroidal vortices interact with opposing local vertical components of flow. This interaction manifests itself by momentum exchange which degrades settling.

To attempt sedimentation under imposed conditions antagonistic to the functional objective seems ill advised. A desirable situation is to recognize that an overall circulation must be considered and that the direct and induced flow described must be complementary to the necessary circulation. This is the general objective of the settling tank of the invention.

This is possible under the case for circular plan view sedimentation if a single toroidal vortex may be induced under controlled conditions of overall circulation. Preferably, this should be done in such a way as to enhance the primary sedimentation flow and, if necessary, to yield a secondary effluent having predictable sedimentation.

This may be accomplished by insertion and use of the central collection 64 described, positioned beneath the central influent jet 82. Its flow is radially inward below the influent jet boundary surface. Owing to the presence of an hyperboloidal diffuser surface 60a, the central effluent can operate with minimum degradation of the influent jet. Moreover, it operates upon a well-sedimented, low turbulence fraction of sedimentation tank contents. These conditions lend themselves to the production of a consistent, predictable fraction of partially sedimented flow which reduces the tank overflow rate.

On the inlet to the intermediate level collector in the sedimentation tanks 66 it may have the hyperboloidal profile of the upper diffuser 60a and that it is less critical in that flow is accelerating. On the system optimization, more fully explained hereinafter, it appears that it is essential to control the process, operated manually or automatically to accomplish the desired flows stated above. Representative means 70 for manual or automatic regulation are provided. Implementation of sensors 72 for flow are an obvious requirement. One way to determine organic load is to measure it by lab techniques on typical days. The average hourly results could be charted. Control of means 70 could be based on the expectation that this would occur. It is also possible to use inferential measurements of load, such as those based on light transmission or spectral absorption in narrow bands of wave length. Probably rapid, intense oxidation could be accelerated sufficiently to give real time data on BOD.

Then system control for manual or for automatic conditions may be based on an expected program (historical findings) modified by real time measurements of the actual hydraulic and organic loading conditions with sensors 72, for example. This is a standard control technique in any servo system. The essential feature is to program, establish errors, impose an error correction and instrument the result to make sure the error was corrected. If not, a secondary correction may be introduced.

FLOTATION SEPARATION

This concept may be introduced with a secondary functional effect of the central influent well 90. The affect is applicable where flotation, particularly for oil and grease separation is of concern. These conditions occur in primary sedimentation. To accomplish this result, presaturation of the influent with air as though injector 92 at pressure levels exceeding that at discharge is desirable. Outgassing of the excess air as the system is depressurized enables enhanced flotation in the influent well 90 of the primary sedimentation tank. This integrates equipment and methods of sedimentation improvement with those of gas-liquid mixing, both as set forth in the present invention.

In the collectors, the nozzles 64 and 66 remove two cuts of flow from the settling tank and from the sedimentation effluent discharges from the overflow weir central collectors. The upper cut is taken from 6 inches to 30 inches below the liquid line which normally runs closely adjacent the top edge of the tank. The lower cut is taken from 36 to 48 inches below such liquid line. The major portion of intercepted flow amounting to approximately ⅔ the total is taken from the upper effluent collector 64. The lower collector 66 removes the remaining flow except for sludge and its entrained liquid. Normally, it will be necesary for the effluent picked up by the nozzle 66 to pass to another processing operation for further treatment. From the sedimentation operation, the basic flow sheet leads to bioprocessing. The effluent flow in the sedimentation tank is indicated by the arrows 94. The effluent enters line 66 through valve 70, up the influent well 90, driven by pump 68, and discharged from the top 91 of well 90, through screen 74 and into a spiral discharge by vanes 60a adjacent the top surface of the effluent level. The diffusers 60a are driven in a slow rotary motion by motor 110 which is supported on a bridge truss 112 which extends over the top of the tank. The motor 110 is of variable speed and appropriately driven for the correct latitude of the tank since the vortex for the effluent actually depends on latitude.

Flow is controlled by valves 82a and 84a, as best seen in FIG. 2 of the drawings, and at the inlet by valve 70. The effect of the valves in inducing turbulence at the diffuser effluent is suppressed by means of the hole size in the screens 72 and 74. It should be understood, however, that similar operations occur at greatly reduced velocities in tank 24 which might cause the elimination of an upper effluent collector 64.

At the end of the vanes of diffuser 60a, the effluent is directed in close to a tangential direction in the horizontal plane. The vertical component of velocity is extremely low owing to deceleration in the diffuser. In view of the low velocity, it is clear that sedimentation will occur in the diffuser. Provision is made for continuous sludge removal. This is done by operating the diffuser at close to zero buoyancy, a mechanical technique readily within the skill of one in the art.

The diffuser 60a is rotated at very slow speed, perhaps one revolution per hour. These serve as collectors of finely classified material. The sludge is removed through pipe 90 in the central section and out through the tank bottom, as well as through a sludge trough 92 and sludge conduit 94.

It has been anticipated that the extreme care taken in settling tank design may be upset by two factors. One is wind induced surface cooling and superimposed horizontal flow. The second is the density analomy in water which occurs at 4° C. The latter factor may have severe consequences in terms of vertical circulation. In addition, there is the usual effect of temperature variation on the density of water. For these reasons, the invention uses an air enclosure over the tank, as indicated by cover 102. This cover 102 mitigates the effects of wind and temperature.

At least one of the central effluent volutes 82 or 84 will be vertically adjustable, and probably both, so as to ensure positioning thereof in accordance with the flow demands through the tank to achieve optimum performance.

To ensure light gravitational loading, the rotating diffuser 80 will be supported peripherally at each sector by wheel 80b running at fixed load on the bottom. The wheel load control may be set with a suitable type of spring loaded washers.

The secondary settling tank 26 receives effluent from the lower cut of the first tank 10. Its primary sedimentation in its diffuser will pass particulates of 200 mesh or finer into the tank proper. The described cut for particulates greater in size than those passing a 200 mesh screen will be deposited and removed from the sedimentation which occurs in the diffuser 80 beneath the false bottom, as in the flow path 78.

In regard to flow, in the secondary settling tank 26, the hydraulic effluent is one-third the plant effluent. The tank proper is intended to separate, in two cuts, the coarsest effluent particles to those of less than 200 mesh. In the upper cut of sedimented flow, two-thirds the effluent is removed. The lower cut of flow removes one-third the tank effluent, or about one-ninth of the initially impressed hydraulic load on the plant. Only this fraction of flow proceeds to the trickling filter or other BOD reduction process.

ROUGHING

Trickling filter

The following discussion will involve the operation of the first bioprocessing stage, a roughing filter 36 commonly known as a trickling filter. No discussion will be given to the aeration stage 34 impressed upon the influent, as this is covered in my copending applications. Bioprocessing operations are responsible for the principal reduction in BOD. The elementary theory of a trickling filter is that an extended surface is provided usually using rock fill, about 6 feet deep, on which a microbial plaque develops under pulsed film flow of waste liquor containing some dissolved oxygen, DO. The plaque is comprised of a surface-contacting anaerobic substrate immediately adjacent to which anaerobic and facultative microbiological forms predominate. Above this layer, aerobic forms may be present. This implies a source of oxygen. Ostensibly this is provided by an induced, vertical, natural-convective air circulation occurring parallel or countercurrent to the pulsed liquid flow.

A fundamental limitation of conventional trickling filtration is the indifferent oxygenation occurring therein. In consequence, aerobic processes essential to bioprocessing are inhibited. Diminished capacity in organic load reduction results. A further limitation aggravates this problem. It arises since, to allow some air circulation, hydraulic loading is restricted. This reduces the capacity of the filter and concurrently the effectiveness of waste treatment. This is so because the hydraulic compromise restricts flow recirculation to the filter, a prime factor in deriving significant BOD reduction.

To indicate the deficiencies of free convective air flow in trickling filters, it is of interest to refer to operating conditions inducing such flow. A basic equation for air velocity as taken from Waste Water & Waste Water Engineering, Fair et al., John Wiley & Sons, vol. 2, pp. 35–13, is:

$$V_a = 0.135 \Delta T - 0.46$$

where $V_a$ is the air velocity in feet per minute, and
$\Delta T$ is the temperature difference between the air and the waste water, ° F.

The waste water-air temperature difference seldom exceeds 25° F. For temperature differences of 10°, 3.4°, and −3.3° F., for example, $V_a$ is respectively +1.0, 0 and −1.0 f.p.m. The positive sign denotes downward flow. Recognizing the filter is a stone-packed bed about six feet deep. In no case is a realistic air velocity indicated. Forced air circulation has been examined with little promise. Packed bed resistance to air flow can be high especially with superimposed hydraulic flows.

The limitations of aeration and compromises in hydraulic loading are unnecessary. The ideal remedy is use of an effective air-liquid mixing system in the trickling filter influent line. This will provide DO in the range of 7 to 8 p.p.m., all year round and at any hydraulic loading. The particularly undesirable restriction of recirculation may be relaxed. This simple remedy will enable hydraulic loading in the range from 1,000 to 3,000 or more gallons per square foot per day. Typical current practice is at about one-fifth these levels. The hydraulic flows are restricted to these levels to defer blocking of air flow which has been necessary to provide for aeration. Having eliminated compromises dictated by inadequacies of aeration in conventional art a simple change enables full exploitation of the revised trickling filter process. This change is one of media, from a size range of coarse rock to a reduced size range of smaller media. The change in media is primarily responsive to hydrodynamic flow. This is so because compromises relating to one flow are unnecessary. Inasmuch as the change is in the hydrodynamic characteristics, it is conventional to describe the desired media properties in terms of hydrodynamic parameters.

The parameters of interest are the friction factor, the Reynolds number and the roughness coefficient. The media size factor applies as an equivalent diameter. The characteristic length of flow path is the bed depth, which is conventional. The relation among these factors is of the form:

$$f = \frac{a}{N_R} + b$$

where $f$ is of the friction factor
$a$ is of a constant
$N_R$ is the Reynolds number and
$b$ is the bed media roughness factor.

The defining equations of interest are:

$$f = \frac{2gDe\Delta P}{LV^2}$$

and $$N_R = \frac{DeV\rho}{u}$$

It suffices to define the media in terms of its equivalent diameter and roughness factor. Flow conditions are stipulated by the functional relationship between friction factor and Reynolds number.

The typical parameters for new media are in the range tabulated next for a hydrodynamic or hydrofoil element. This arises in relation to an influent waste with high DO and no aeration required in the filter proper.

I have calculated a substitute plastic media, for example PVC. The media is extruded tubing. It is assembled in an equilateral triangular grid to maximize the surface installed per unit volume.

The tubes are spaced to ensure balanced flow inside the vertically positioned tubes and outside the tubes. This requires that the hydraulic radius for the internal and external passage be equal.

Figure 12:
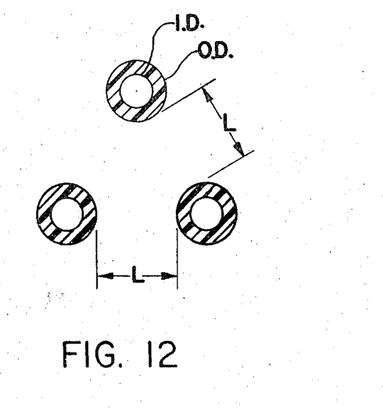
FIG. 12 is a cross-sectional end illustration of the tubular media which can be used in the trickling filter.

A typical result appears as follows as is illustrated in FIG. 12.

OD=.84 inch
ID=.74 inch
L=Grid spacing 1.16 inch
The hydraulic radius of a channel is: Area of section/perimeter The section described above exhibits an area for biological plaques of about 40 ft.$^2$/ft.$^3$. Conventional rock is less than 40% of this specific surface.

The lengths may be full depth in a continuous section, from 6' to 18'; however, shorter lengths stacked to the total depth have advantages. The basic advantage is that the laminar boundary layer of liquid or the plaque starts at zero thickness and builds up. A length which is short compared to the length required to fully develop a stable laminar boundary layer keeps the dissolved oxygen supply to the plaque readily available. The diffusion gradient is increased in two ways. First the concentration is sustained at high levels, second the boundary layer thickness is decreased.

The length for a fully developed boundary layer in laminar flow is a great as twenty feet for water flowing in tubes of about ¾ inch diameter in the limiting transitional range of Reynolds number, about 3,000. Expressing distance in terms of diameter, the transition length is about 1/10 to 1/20 the Reynolds number.

The flow in the spaced tubular media at the limiting laminar Reynolds number may be estimated. It is 22 millions gallons/day per 1000 square feet of media surface. Hydraulic loading rates are conventionally less than 1 million gallons/day per 1000 square feet. Thus, planned high hydraulic loading is feasible with this media.

Moreover, the uncompromised rates enable much higher organic loading. Instead of present upper limits of less than 70 pounds of BOD per day on each thousand cubic feet of media, three to four times this load appears feasible. The high organic loading only becomes practicable with preaeration which permits much higher hydraulic loading. All three variables, DO, hydraulic loading and organic loading, interact. Because of this, only a mutually compatible solution is feasible. In this instance the equipment and method involved bring into action the integrated benefit of efficient gas-liquid exchange and bioprocessing operations.

Figures 4, 6:
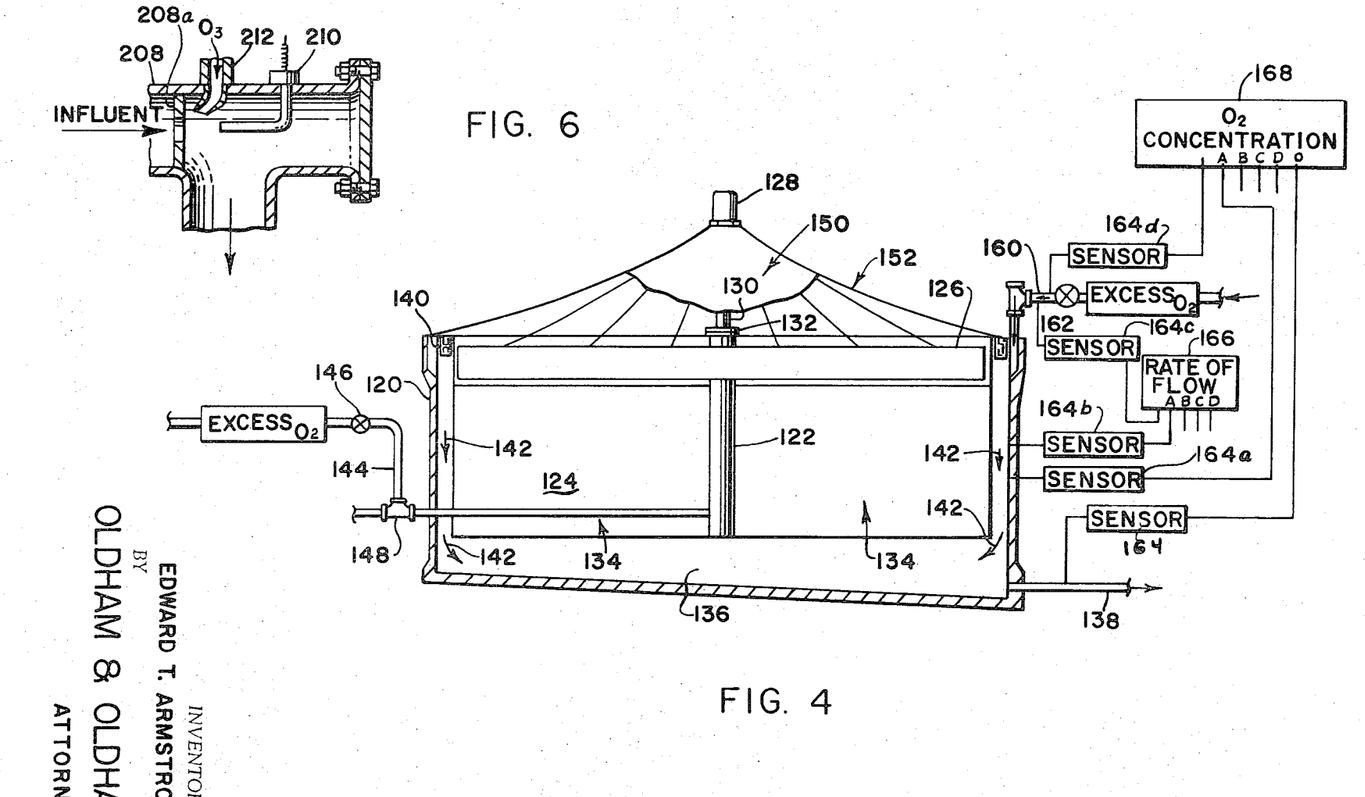
FIG. 4 is a cross-sectional, schematic view of an improved trickling filter comprising a stage of the system of the invention.
FIG. 6 is an enlarged cross-sectional view of one of the flat plate orifices associated with the disinfection unit of FIG. 5 indicating the gas input and sting relationship to the orifice to obtain maximum efficiency in the introduction of the disinfecting gas and the elimination of concentration gradients.

The structural details of the improved trickling filter utilizing a 134 media described hereinbefore are illustrated in FIG. 4 of the drawings which shows that a circularly-shaped housing 120 centrally mounts a carrying post 122 which receives the liquid effluent through pipe 124 carrying the aerated effluent discharge from the settling tanks. The post 122 rotatably carries a distributor arm 126 which is rotatably driven hydraulically by reaction or by a motor 128 connected thereto through shaft 130 and double flanged coupling 132. The liquid influent through pipe 124 passes up through center post 122 and actually distributes in a sprinkled relationship out the distributor arm as it is rotated by motor 128, all in substantially the conventional manner heretofore utilized in trickling filters.

In the particular construction utilized, some type of wire mesh to form a large circular bed indicated generally by numeral 134 is filled with loosely packed stones or the specialized materials defined above that offer promise of providing greater surface ranges per unit volume. As long as the problems of plugged liquid flow and undue gas-phase flow restrictions are considered, extended surface packing can be used effectively in this configuration. In any event, the liquid sent out by distributor arm 126 drips down through the packed beds 134 into the open base.

In addition, the invention contemplates utilizing a plurality of forced air blowers, each indicated generally by numeral 140 positioned around the periphery of the tank 120 and adapted to drive air in the direction indicated by the arrows 142. Since one of the purposes of such a trickling filter to reduce BOD count is to insure more oxygen is present to cause oxidation of the liquid effluent, such forced air which must necessarily pass up through the bed in a reverse flow to the liquid flow therethrough, provides a considerable improvement in reducing the BOD count. Further, in order to provide the increased oxygen atmosphere, excess oxygen is actually injected into the effluent through pipe 144 into some type of turbulent mixing chamber 148, as appropriately controlled through valve 146. Also, in order to make the filter operate on nearly 100% humidity in the atmosphere, some type of roof covering indicated generally by numeral 150 may be provided that is supported by a catenary cable arrangement 152. Hence, the trickling filter may utilize 100% relative humidity, forced air circulation, and an oxygen enriched atmosphere because of the oxygen injection into the effluent. The increase in plant capacity and reduction in BOD is remarkable with this setup.

In this aerobic process it is also apparent that the design features described for improved sedimentation means may enhance the waste treatment system overall. In other words, oxygen injection into the sludge digestion unit 22 is contemplated so as to greatly enhance the operating capabilities of that unit to produce safe sludge concentrations.

The invention might also incorporate the addition of excess oxygen directly into the humidified atmosphere through a pipe 160 as controlled by valve 162. The control of the amount of oxygen entering might be appropriately provided by a suitable sensor 164 associated with the effluent output pipe 138 and operating in conjunction with a rate of flow instrument indicated by block 166, and an oxygen concentration unit indicated by block 168. Appropriate sensors 164a–d are associated with the rate of flow instrument 166 and oxygen concentration unit 168 to complete this setup, so as to control the actual amount of oxygen flow through pipe 160 for the most economical operation of the system.

BIOPROCESSING SECOND STAGE ACTIVATED SLUDGE

An activated sludge operation may be the sole bioprocessing unit or a secondary element in a two-stage bioprocessing operation. It is unlikely to find activated sludge as the initial element of a two-stage bioprocessing operation. This is in recognition of the sensitivity of activated sludge operations to fluctuating influent hydraulic or organic loads. Although not present typical practice, activated sludge operations may be adapted to handle fluctuating hydraulic and oragnic plant influent loads. This may be done by providing sufficient flexibility in circulation to accommodate independent balancing of hydraulic and organic load incident upon the activated sludge operation. This has been referred to before and will be discussed under system integration.

Regardless of the mode of application of the activated sludge operation, a predictable requirement exists for aeration. Observed aeration corresponds to from 500 to 700 cubic feet of air per pound of BOD removed. The implied oxygen requirement is from 7.5 to 10.5 pounds of oxygen per pound of BOD removed. An equivalent quantity is derived from surface aeration. Thus, the overall conventional requirement for oxygen is from 15 to 21 pounds of oxygen per pound of BOD removed. Recalling that BOD equates one to one with oxygen demand by definition, the implication is that oxygenation by aeration using conventional techniques is not remarkable for efficiency. This inference remains valid even allowing for available internal sources of oxygen as from the biological reduction of nitrates. This finding is to be expected since aeration efficiencies are often quoted in the range of 2% to 10%. It should be understood that the quoted values pertain to aeration of liquid having an initial DO of zero. This yields the highest possible efficiency. A more realistic efficiency is that for a DO in the range of 2 p.p.m.

The practical solution to the aeration question in activated sludge operations is set forth in my copending application identified above. The technique and equipment derives oxygen mixing efficiencies in excess of 50%. Use of such aeration means in the present activated sludge operation is visualized. This will require air compressor capacity reduced by as much as an order of magnitude and sludge recirculating pumps. The treatment method may be any of the seven basic methods utilized in activated sludge operations. What is important is the integration of efficient gas-liquid mixing techniques with this stage of bioprocessing.

From the activated sludge operation, treated waste discharges to secondary sedimentation.

SECONDARY SEDIMENTATION

In the case illustrated in FIG. 1, the processed waste from the activated sludge operation is discharged in a central influent as well as for primary sedimentation. Here, however, excess aeration to achieve degassing and enhanced flotation of grease is unnecessary. With this exception, the equipment and process operation may be as described for primary sedimentation previously. As might be expected, exceptions occur in the preferred disposition of effluent from secondary sedimentation.

For example, sedimented secondary sludge is removed conventionally and returned to the influent of the activated sludge operation. Some of this flow is diverted so that excess sludge is fed to the primary digester. Clarified effluent is discharged to disinfection with diversion of necessary quantities to secondary recirculation. To achieve desired balance between the hydraulic and organic loading imposed by secondary recirculation, intercepted partially sedimented flow may be incorporated in the secondary recirculation. This is shown in FIG. 1.

In the effluent from secondary sedimentation destined for disinfection, disinfection is initiated at the line exiting the secondaries. This technique exploits highly efficient gas-liquid mixing techniques described in the above-identified copending application. The disinfectant proposed is ozone-oxygen for several reasons. First, the disinfectant is effective with the organic loads present in brief contact times. Second, this disinfectant is potentiated, i.e., it acts synergistically in the presence of a secondary oxidizing system. The secondary oxidizing system may be ferric chloride added in secondary sedimentation to promote clarification, or it may be the standard chlorination additions. In either case, ozone-oxygen reduces the ultimate chlorine demand and ensures an effluent exhibiting relatively lower chlorine residues with high dissolved oxygen. The disinfection characteristics of ozone-oxygen and potentiating effects of ferric chloride are noted. The standard technique adds ferric chloride to secondary sedimentation system so it cooperates with $O_2$–$O_3$ added in disinfection.

OPTIMUM SYSTEM

System optimization in waste treatment is usually discussed in terms of a fictitious constant load. Optimization may not refer to meeting effluent quality standards of a minimum combined capital and operating cost.

CHARACTERISTIC LOAD

The characteristic waste load on a plant is a combined hydraulic and organic load. It is not constant during the day. It is likely to be repetitive day to day, excepting holidays and weekends. Rain and seasonal effects impose long period changes in load.

Weekday loads may be approximated reasonably well with a geometric series of few terms. It is not unusual to find that the range in load may be as great as ±75% of the average load. Somewhat in contrast with this fluctuating load, effluent criteria on quality typically require that a prescribed maximum never be exceeded. Practically, this means that plant regulation is aimed at achieving better quality with .95 or .99 probabilty. How much better the quality goal should be is a critical economic consideration.

Obviously, with a fixed output specification and a highly variable input, no fixed settings in process regulation will approach compliance and economy. An obvious approach is to accumulate mixed waste for residence times of a day to treat a continuous sample at the average daily rate. This would require large holding tanks and problems of settling, septicity and cost arise.

Despite these problems, great advantage accrues from the constant hydraulic and organic loading obtainable by optimum system utilization. The basic advantage is in simplicity of controlled, regulation of the plant process. The plant is essentially a servo system. To get a fixed output at a prescribed level, it would obviously be easier to find the fixed process settings to meet this level where the input is also fixed. With the actual input, the best process design and control is a then sophisticated problem. Although, this problem is a basic one economically, it has not yet received the attention it deserves.

In the equipment and process implementation of this concept, a dual attack on the design and control problem is proposed. Basic to the attack is provision of adequate flexibility in process control to enable a close approach to uniform hourly hydraulic and organic loading over a typical operating day. This minimizes the magnitude and effect of imposed fluctuations in hydraulic and organic load. The second basic element of approach is to provide process control to operate on the suppressed load variations to achieve the desired level of effluent quality continuously. This yields the optimum system in terms of minimized total cost to derive continuously the acceptable quality of effluent. Calculated performance, process conditions and basic factors in total cost have been determined and are set forth in more detail hereinafter.

With respect to the system optimization the ideal solution requires excessive sedimentation tank capacities, both in the primary and the secondary tanks. The practical answer is to compromise the flow.

Figure 11:
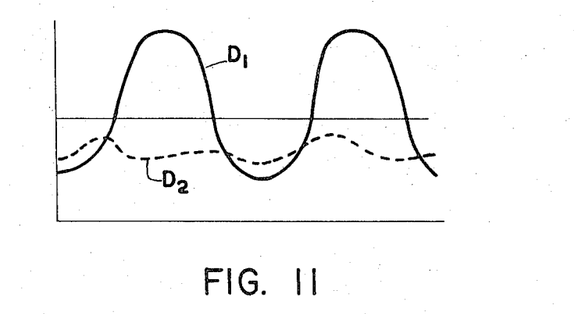
FIG. 11 is a graphic illustration of Case D also defined in the specification.

The examples, A, B and C show that for an arbitrarily variant inflow rate and organic load concentration, it is possible to achieve a process influent having a constant inflow rate and a constant organic load concentration. The demonstrated condition pertains to the sedimentation tank influent in each example. Thereafter in the process, the hydraulic load varies with time, but the organic load concentration is held constant. The compromise condition allows a variation in hydraulic and in organic load to the sedimentation tank. Lower total influent rates to primary sedimentation result. The design condition is imposed next in the process. This means that the interval $a$–$b$ over which integrals are considered is short or that point values are used. In addition, a simplified on-off control to approximate the exact solution is shown. This substitutes a rectangular region for integration in place of the region beneath a trigonometric curve, or an actual plot of station load, hydraulic and organic. Case D shows that where $Q_1=3.0$ for the 24 hour day rate, a total flow of 3.8 provides an optimum system flow. The flow condition yields a close approximation to constant organic load concentration to the trickling filter, as shown in the graph of FIG. 11. In an activated sludge process, the concentration could be held constant by return sludge rate controls. Hydraulic loads would vary in either illustration of the solid graph $D_1$, or the dotted graph $D_2$ of Case D.

Figure 8:
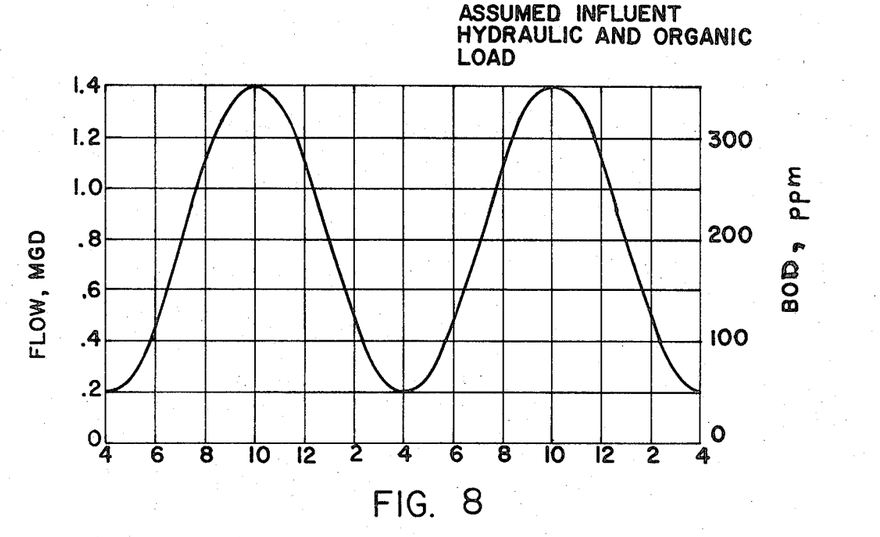
FIG. 8 is a graphic illustration of the assumed influent hydraulic and organic load.
Figure 9:
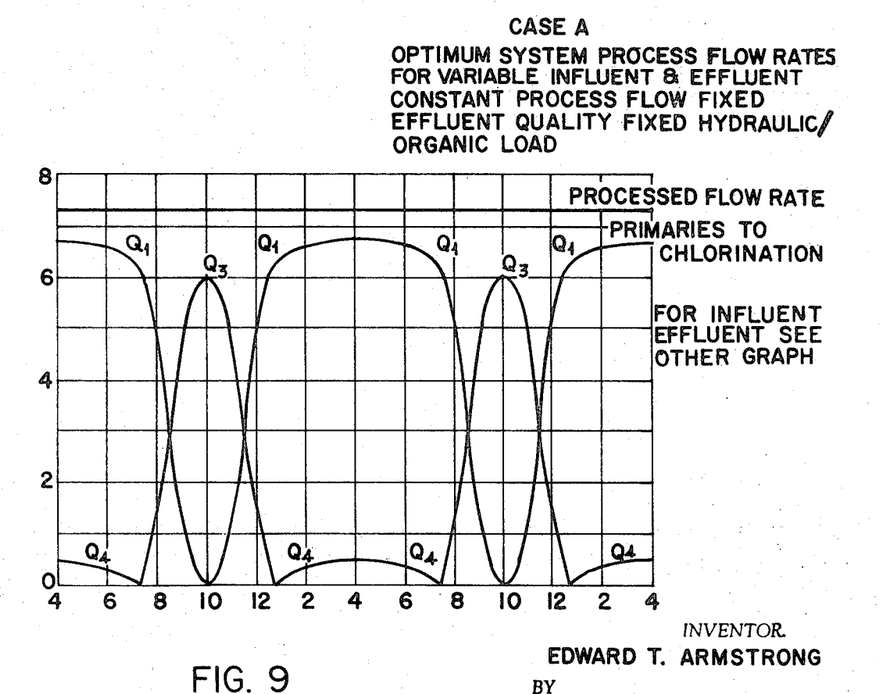
FIG. 9 is a graphic illustration of the optimum system process flow rates for Case A and a variable influent for Case B with constant process flow with a fixed effluent quality and fixed hydraulic/organic load.
Figure 10:
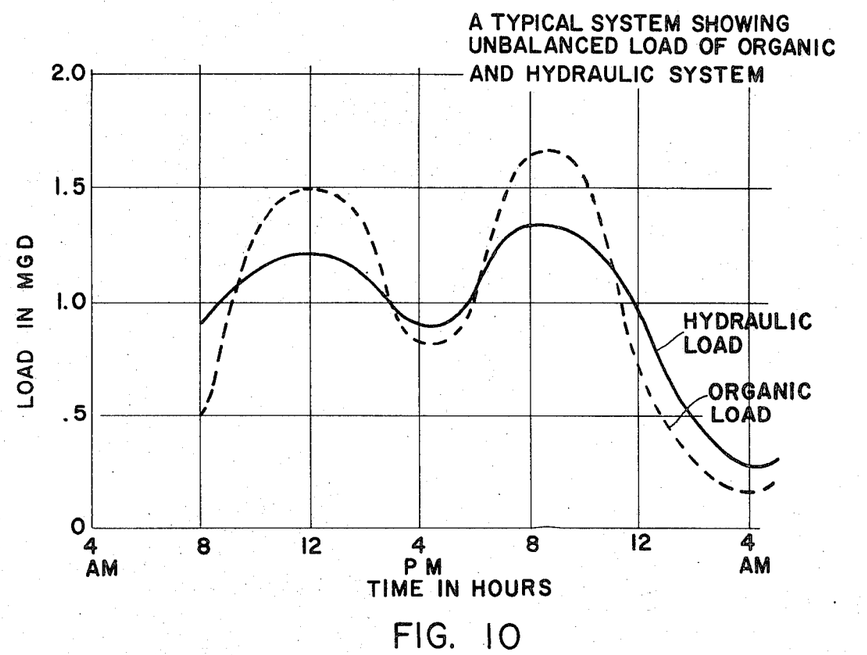
FIG. 10 is a graphic illustration of the flow load system optimization in Cases A, B and C defined in the specification.

Case A.—Schematic flow sheet shown in FIG. 10 illustrates conditions for uniform hydraulic and organic load with an arbitrary variable incident load. The figures shown between sections in FIG. 8 are the BOD of the treated waste in p.p.m. Case A, also shown by the graphs of FIGS. 8 and 9, uses process control of flow in $Q_1$, $Q_3$, $Q_4$ and $Q_5$. $Q_2$ may be held at zero.

Maximum Load—$Q=1.4$ m.g.d.·$B=350$ p.p.m.
Secondary recirculation for 10:00 a.m./p.m. load.

(I) (BOD) 83. $[Q+Q_3]=1.4\times350+Q_3\cdot20$ $$Q_3=\frac{1.4[35\oplus 83]}{83-20}=\frac{1.4\cdot267}{63}=5.93$$

Recirculation ratio;

$$R=\frac{5.93-1.4}{1.4}=3.24$$

Flow to primary: 5.93 m.g.d. rate
Secondary recirculation for 8:00 and 12:00 a.m./p.m. load $$83\times5.93=1.1\times275+20\cdot Q_3=58[483-Q_3]$$
$$Q_3=107.5/38=2.83$$
$$Q_1=4.83-Q_3-2.0$$

Secondary recirculation, other flows, 7:00 and 1:00 a.m./p.m. This is the average load condition.

$$83\times5.93=1.1\times275+20\cdot Q_3=58[483-Q_3]$$

and, if $Q_3$ is zero:

$$5.93\times83=.8\times200+20Q_3+58[5.13-Q_3]$$
$$492+34=20Q_3-58Q_3$$
$$Q_3=-34/38=\text{approximately}-1.0$$

(II) Case for 8:00 and 12:00 a.m./p.m.

$$83\times7.33=1.1\times275+20Q_3=58[6.23-Q_3]$$
$$610=20Q_3-58Q_3=-38Q_3$$
$$Q_3=54/38=1.42$$
$$Q_1=6.23-1.42=4.81$$

(III) Case for 7:00 and 1:00 a.m./p.m. average load $$83\times7.33=.8\times200+20Q_3+58[6.53-Q_3]$$
$$610-160-379=71=-38Q_3, \text{ but for } Q_3=0$$
$$71=58Q_1, Q_1=71/58=1.23$$
flow check $6.53B+.8\times200=83\times7.33$
$$6.53B=450$$
$$B=450/6.54=69$$

flow must shift to $Q_1+Q_4$ continued percent solids primary 3% and percent solids secondary 6%

Primary sludge 3% at 7.33 m.g.d.=.22 m.g.d.
BOD=83−58 approximately
Average supplied=approximately 2500.

(IV) $83\cdot7.33=.8\times200+600Q_4+58[6.53-Q_4]+71$ $$=600Q_4\oplus58Q_4$$
$$Q_4=71/542=.131 \text{ m.g.d.}$$
then $Q_1=6.40$ m.g.d.

(V) Conditions at 6:00 and 2:00 a.m./p.m.

$$83\cdot7.33=.5+125+600Q_4+58[6.83-Q_4]$$
$$151=600Q_4-58Q_4$$
$$Q_4=.279 \text{ m.g.d.}$$
$$Q_1=6.55 \text{ m.g.d.}$$

(VI) Conditions at 5:00 and 3:00 a.m./p.m.

$$83\cdot7.33=.28\cdot70+600Q_4+58[7.05-Q_4]$$
$$181=600Q_4-58Q_4$$
$$Q_4=.33 \text{ m.g.d.}$$
$$Q_2=6.72 \text{ m.g.d.}$$

(VII) Conditions at 4:30 and 3:30 a.m./p.m.

$$83\cdot7.33=.22\times55+2500\cdot Q_5+58[7.11-Q_5]$$
$$Q_5=.089 \text{ m.g.d.}$$

or showing alternative for secondary sludge method of digestes supernatant $$83\cdot7.33=.22\times55+600Q_4+58[7.11-Q_4]$$
$$186-Q_4[600-58]$$
$$Q_4-.343 \text{ m.g.d.}$$
$$Q_1-6.77 \text{ m.g.d.}$$

Conditions at 9:00 and 11:00 a.m./p.m.

$$83\cdot7.33=1.32\times327+20Q_3+58[6.0-Q_3]$$

(VII) Conditions at 8:30 and 11:30 a.m./p.m.

$$83\cdot7.33-1.22\times305+20Q_3+58[6.11-Q_3]$$
$$Q_1=3.11; Q_3=3.0$$

(IX) Condition at 9:00 and 11:00 a.m./p.m.

$$83\cdot7.33=1.32\times330+20Q_3=58[6.0-Q_3]$$
$$-174=-38Q_3$$
$$Q_3=4.58; Q_1=1.42$$

(X) Condition at 9:30 and 10:30 a.m./p.m.

$$83\cdot7.33=1.38\times345+20Q_3+58[5.95-Q_3]$$
$$-211=-38Q_3; Q_3=5.55$$
$$Q_1=0.4$$

Case A pump capacities.—Flow around primary sedimentation equals gravity. Flow around trickling filter equals zero. Flow around secondary sedimentation equals $Q_1-Q_4=6.4$. Flow from secondary sludge equals 0.4. Then, 0.400,000/24 60=278 g.p.m. Use 300 g.p.m. 2:150 g.p.m. Secondary 6.4/1440–4,450; use 4:1200 g.p.m.

EQUIPMENT SIZING CASE A

| | Diameter, ft. |
|---|---|
| Primaries 4 | 60 |
| Secondaries 4 | 60 |
| Trickling filter 2 | 75 |

System characteristics.—Large sedimentation requirements. Moderate pumping requirements. Conservative bioprocessing requirements. Fixed effluent BOD to chlorination of 20 p.p.m., with influent BOD's from 50 to 350. BOD reduction is from 94.3% to 43%.

A second case may be examined. It reduces primary and secondary sedimentation requirements. See Case B.

Further, with respect to Case B, it appears that a practical variation from the illustrative Case A which has been described above, is based on a compromise at the peak flow condition occurring at 10:00 a.m./p.m. The compromise is to accept a system condition as at 9:00 or 11:00 a.m./p.m. for the hydraulic load. An organic load in p.p.m. can be held constant. Instead of the ideal situation, holding the hydraulic load constant, 24 hours per day, we hold the system hydraulic load at the 9–11 level. Then, in the interval 9–11 a.m./p.m., i.e., twice a day, for 2 hours, a hydraulic overload is allowed. This only affects the primary and secondary sedimentation tanks, and not seriously, in comparison with the cost reduction enabled. Except in the interval 9–11, the system hydraulic and organic load may be held constant.

Of course, other compromise expedients may be selected. For example, the interval might be 8–12. For the three cases, A, 9–10, 8–12, the relative flows are 1.4, 1.32 and 1.1. Most state laws require that sedimentation tanks be proportioned to accommodate specified overflow rates expressed as m.g.d. per unit of surface area. Thus, reducing from 1.4 to 1.1 means that the required area reduction is 3/1.4 which is roughly proportional to the cost reduction.

Cases B and C shown together with Case A in the graph of FIG. 9 show the trend of such compromises. In Case B, the compromise approximation is shown in solid lines which may be compared to the curves for the ideal solution. As Case B is examined, it is apparent that a further compromise solution is feasible. It is shown in Case C.

Case C shows on-off full flow changes in the recirculation from the sedimentation tanks. A similar flow is shown for the secondary sludge returned to the plant head box from the secondary sedimentation tank.

The all or none flows shown are typical of practical manual control. Valve settings may be made and left for an appreciable time. This type of control is also amenable to automatic regulation of the plant. Simple time controls can accomplish this type of regulation.

The previous discussion involved more sophisticated controls typical of usual servo control system. The foregoing conditions are a convenience in calculation. The calculations set forth above and the graphs of FIGS. 8 through 11 are based on controls of definite integrals. The integrals concerned are of the form:

$$Q = \int_a^b qc\,dt$$

where:

Q is an organic load
a, b are time limits for the load increment considered
q is a flow rate
dt is differential time.

In effect, control is based on manipulation of definite integrals to approximate organic load concentrations at indicated points in the overall process. A particular case is shown at the influent to the sedimentation tank where the organic load and the hydraulic load are held at constant values. The effect on increased overflow rates at the sedimentation tank has been noted above.

To relax the overflow rates at primary sedimentation, it is feasible to impose the condition for constant hydraulic and organic load at bioprocessing. For a trickling filter or an activated sludge unit operation, it is desirable to hold the hydraulic and also the organic load constant. This is particularly so of activated sludge unit operations. To illustrate this condition, a limited number of calculations as set forth above are indicated to show a typical solution.

DISINFECTION SYSTEM

Figure 5:
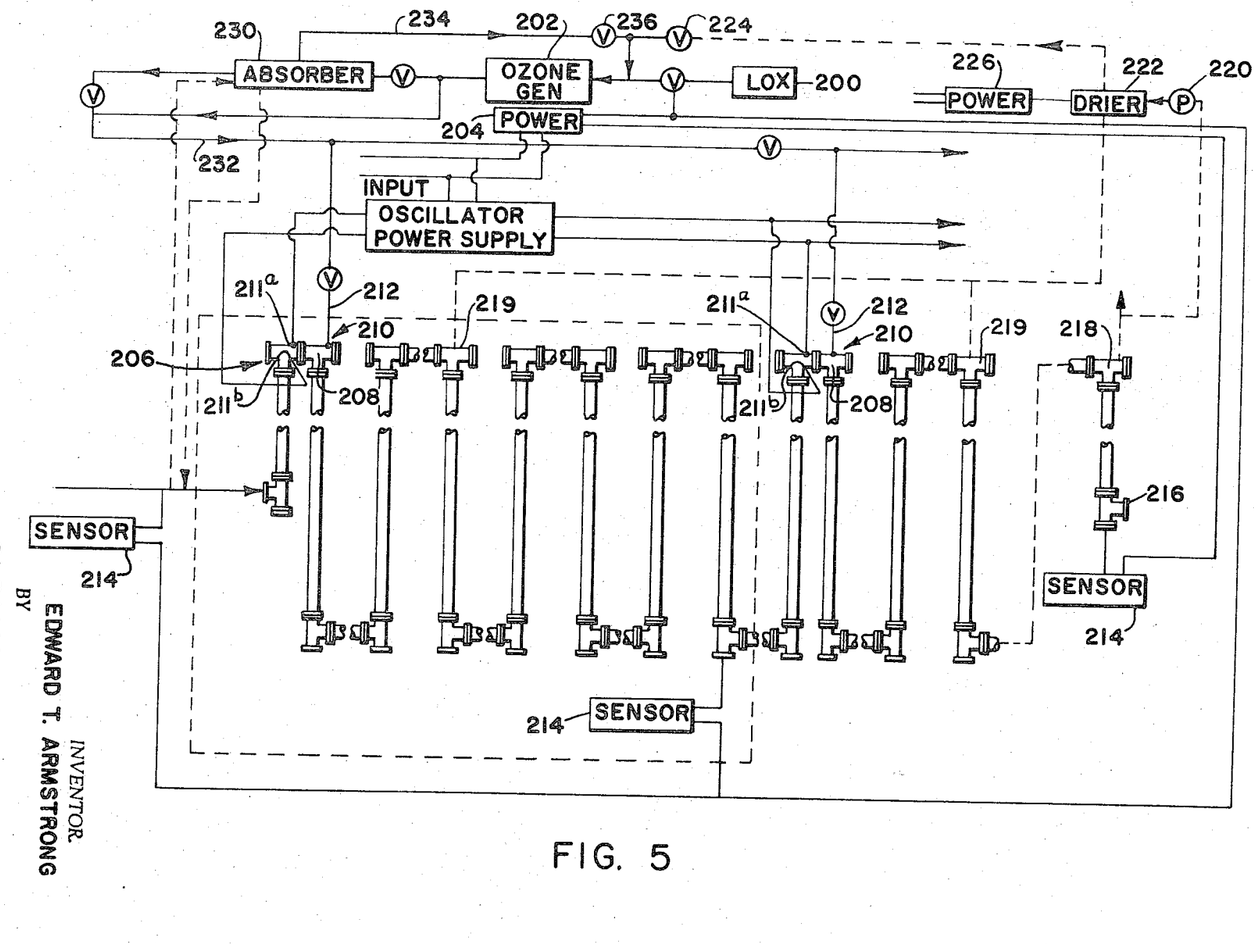
FIG. 5 is a schematic flow diagram of the disinfectant unit indicating the operation under a hydraulic gradient with sensors and gas input control.
Figure 7:
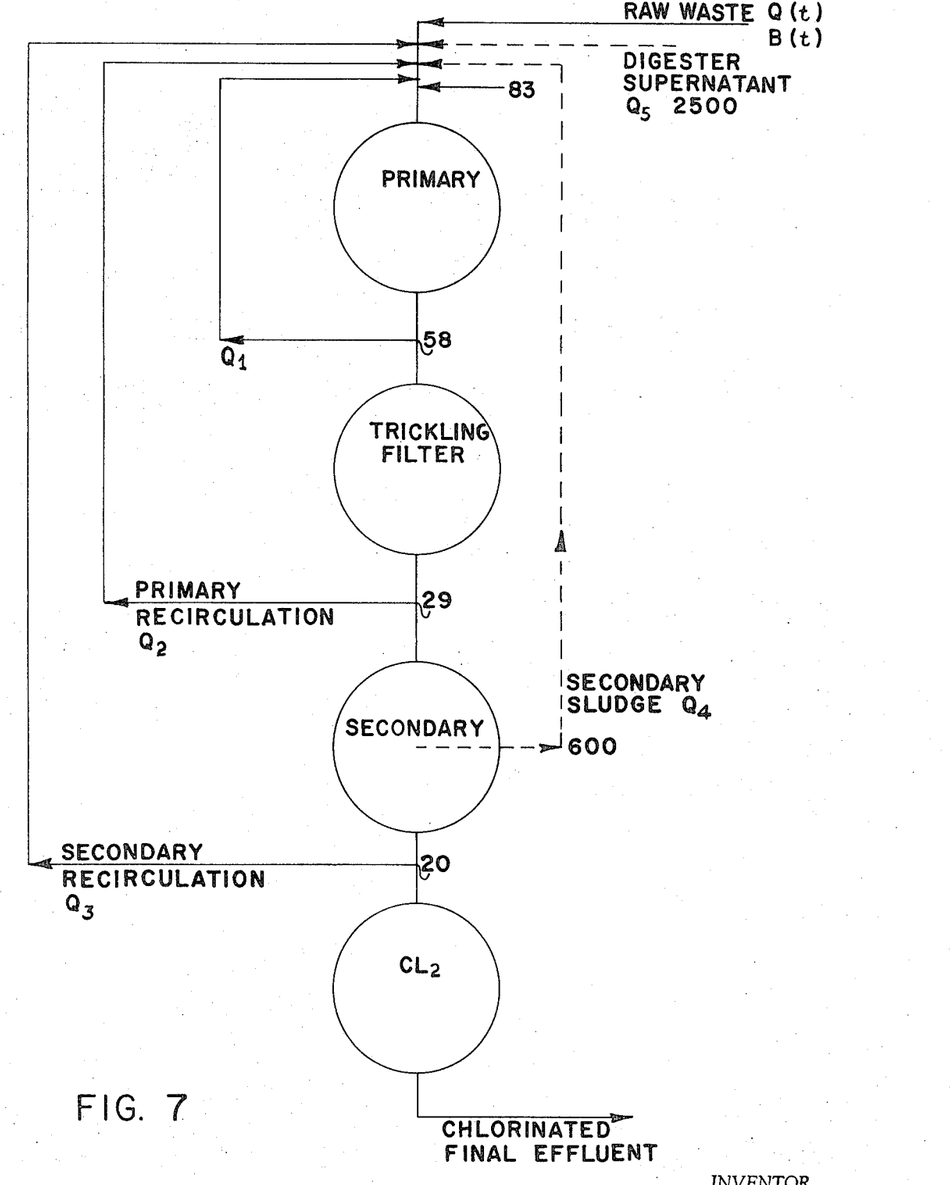
FIG. 7 is a flow diagram of a modified basic system illustrating system optimization and flow control.

The disinfection system indicated in FIG. 5 of the drawings is a gas-liquid mixing system operating under a hydraulic pressure gradient. It is comprised of a liquid oxygen supply 200, an ozone source or generator 202, an oscillator power supply 204, and a process flow line indicated generally by numeral 206. The line 206 operates in the regime of turbulent flow, at or above a Reynolds number of 3,000. High momentum exchange mixing elements are carried in at least certain of the T-shaped flanges 208. These mixing elements are normally flat plate orifices which induce intense mixing sufficient to minimize radial concentration gradients in the processed liquid effluent entering the flow line 208 at 210. The mixing elements 208 may be followed by sting-type cantilevers driven by a tunable source 211 excited at or near their natural frequency. These may be positioned in relation to the gas injecting means to further enhance the momentum exchange in primary regard to minimizing concentration gradients occurring in the angular direction in addition to the radial gradient suppression induced by the basic mixing element, the flat plate orifice. In addition, the primary objective is to have the stings 211 provide mechanical disruptive forces on flocs, plaques, or agglomerates which may be present in the processed liquid effluent. The objective of imposing disruptive forces is to reduce the size and to extend the available surface for disinfection on such flocs, plaques or agglomerates.

The orifices in the T's 208 are provided at the flange joints as a matter of convenience. The orifice diameter ratio to the pipe diameter is typically equal to or greater than 0.7. In the T's 208 securing the orifices, two other elements are mounted. One is an $O_3$–$O_2$ injector 212. The injector 212 is introduced in a fitting ideally centrally allowing axial positioning which extends through the orifice preferably to or slightly past the vena contracta formed by the flow through the orifice. Optimal injection is found to be with minimum concentration gradient in the flow direction. This is most conveniently obtained by making the fluid flow rate steady over short or longer intervals of time and by similar proportional control of gas flow. The sting 211 is the second element introduced with similar provision for axial position and sealing as the injector 212.

The $O_3$–$O_2$ injection occurs at approximately 5% or less concentration by weight of ozone in oxygen. For generalized disinfection, it is introduced in amounts greater than 0.5 milligram of ozone per liter of fluid. The injected concentration will attenuate in the flow line. Two factors cause the attenuation. One is the decomposition rate for $O_3$ in water leading to $O_2$. The second attenuating factor is the oxidation load of the material contained in the processed liquid. In the typical waste, this is comprised of organic materials incompletely oxidized to stable forms. These materials in conjunction with oxidizable inorganic constituents comprise the BOD load of waste.

Recognizing that $O_3$ attenuation which will occur, it may be necessary to utilize sequential injection. This aspect is shown in FIG. 5. FIG. 5 also indicates a series of test points in the flow line between injection points for the $O_3$ which include sensors 214 that act to control a power supply 203 to the generator 202. These sensors 214 are useful to assess quantitatively the $O_3$ concentration and the BOD reduction. For a given Reynolds number, these data provide information on time and position. This information is essential for design of the flow system and for determining the optimum $O_3$ injection flow rate. For generalized disinfection, it is important to the invention that the injection rate and interval be such that the attenuated $O_3$ concentration exceeds 0.5 milligram of ozone per liter of effluent at all points in the system in which generalized disinfection is to occur. In contrast, specialized disinfection as of obligate anaerobic forms of bacteria may be sustained with aid or oxygen containing only trace quantities of ozone as usually found in concentrations of 0.01 p.p.m. or less. This process and implementation is detailed in my above identified copending application.

From the above, the purpose for sequential injection is clear. The number of points, or the distance or time in the flow line will depend upon the impressed oxidation load and particulate size of this load. It is anticipated that in normally operating systems, the time for processing will not exceed 8 minutes. It should be understood that the piping system indicated in FIG. 5 will normally extend in a vertical direction wherein the entrance at 209 and discharge at 216 are at comparable horizontal locations so that in essence a hydraulic gradient is present when considering the system as a whole. The relative vertical location of these points is immaterial to the effectiveness of the disinfection system.

The actual construction of a T 208 showing the flat plate orifice 208a, the centrally positioned $O_2$–$O_3$ injector 212, and the oscillating sting 211 in greater detail is shown in FIG. 6 of the drawings.

The invention also contemplates that excess oxygen can be picked off the piping system at point 218 by a suitable pump 220 and sent into a drier 222 for transfer therefrom through a control valve 224 into the supply line from the liquid oxygen source 200 to the ozone generator 202. A suitable power supply 226 activates the drier 222.

An absorber indicated by block 230 might be included to receive the output from generator 202 before passing the ozone concentrated fluid into a supply line 232 so as to remove all excess oxygen with the excess oxygen fed back over line 234 and through valve 236 to the supply to generator 202. The absorber 230 is optional as the $O_3$–$O_2$ concentration can pass directly through line 238.

In some instances, it might also be desirable to have processed liquid effluent entering at point 209 into the piping system 206 pass through some type of absorber to degas or desorb $O_2$ out of the effluent since you can't get new $O_3$ into the fluid in an $O_2$ carrier gas if the fluid is saturated with $O_2$. A dotted line 240 illustrates this optional arrangement.

It should be understood that the system described hereinabove calls for the preferred implementation utilizing a liquid oxygen feed. This may be refined incorporating recycled, dried, and recovered oxygen. However, continuous recirculation may not be feasible, and in this case it is apparent that there exists a desirable bleed-feed rate for the oxygen supply. The rate should satisfy the DO requirements on effluent and the argon dilution problem whereby ozonation efficiency may degrade with increasing concentrations of contaminant gases. Also, the installed capacity of the bleed-feed $O_2$ supply should be at the average anticipated $O_3$–$O_2$ demand. This will minimize the capital investment required.

With reference to the passage of the effluent through absorber 230, it has been found that 7 to 40 p.p.m. may be recovered from the effluent before discharge for use in the oxygen enriched process in the waste treatment system. Other techniques other than desorbing that might be utilized would either be heating or cavitation, where the cavitation might involve ultrasonic excitation as set forth in my above identified co-pending application.

It should also be noted that the entire disinfection process set forth preferably uses liquid oxygen feed, not air, thus avoiding the presence of nitrogen. In using only oxygen as described, a number of significant improvements naturally follow. It is a known physical fact that the potential solubility of oxygen in water if five to six times as great if introduced in equilibrium for oxygen enabling a higher concentration of ozone to be injected while less oxygen is required. The elimination of oxides of nitrogen contributes to safety and air pollution control. Further, the availability of oxygen for recycling and for process enhancement reduces the oxygen expense by an order of magnitude or more while the process enhancement is increased as pointed out above.

Also, recovered oxygen may be utilized in the trickling filter or activated sludge operation by oxygen-effluent injection, or by enrichment with this oxygen of a basic air-effluent injection means. In this way a trickling filter bed should maintain aerobic metabolic rates at maximum quantitative levels throughout its entire depth. A similar effect on the activated sludge operation is possible. The effect on increased BOD reduction is apparent.

FORCE MAIN INJECTION

The aeration for force main injection has been practiced in the range of 4 parts of air in from 10,000 to 100,000 parts of fluid by weight. The volume concentrations need not exceed 50% of air in liquid. For force main injection, useful results may be realized to much lower levels, perhaps as low as 1–5% by volume. Wet well aeration may be effective at appreciably lower feed rates. The limitation for this case depends on degassing at the impeller eye, leading to eventual loss of pump prime. This problem is also more fully covered in my above-identified co-pending application.

The saturation levels for aeration of water are near 20 parts per million by weight. For waste, somewhat lower saturation limits may be expected in view of the presence of additional contaminating gases and dissolved materials, i.e. for aeration. In the oxygenation case, water saturation levels are in the range 40 to 50 p.p.m., by weight. For ozonation, with oxygen as the carrier, at 6% ozone in oxygen, by weight, the saturation range corresponds to ozone in liquid concentrations of about 2.5 p.p.m., by weight. The foregoing ranges may be useful as depicting preferred ranges of gas concentration.

As is known, force mains operate intermittently according to the influent rate to the wet well and the level settings used to control the pumps. When the pumps shut down, a pressure wave travels through the system, is reflected, returns, and oscillates periodically ultimately damping out. The pressure fluctuations occur below and above the static pressure level in the line. The pressure differences may compare with the dynamic-static pressure difference or they may exceed this difference. Such pressure waves are referred to as water hammer. Air present in force main incident to aeration to control septicity affects these pressure waves. The presence of air reduces the pressure differences, it reduces the velocity of the pressure waves in the force main, from one end to the other and the air damps out the pressure oscillation rapidly, all in comparison to the force main response to pump shut down without air injection to the force main. All these results are beneficial and are a bonus accruing from the practice of air injection to force mains. Thus, it is apparent that force main used for waste, water, or liquid generally, such as oil, may benefit from aeration, or inert gas injection as with nitrogen or carbon dioxide. Preferred gases are those which are not unduly reactive and which exhibit low saturation levels in the liquid transported. This reduces the gas compressor capacity required to inject an excess of gas beyond the saturation concentration. The beneficial results on pressure reduction occur predominantly from undissolved gas.

A dispersed municipal collection system was equipped with aeration equipment according to the principles set forth. Before aeration, waste received at the processing plant was septic, exhibited zero or trace dissolved oxygen and exerted no demand on oxygen saturated in the waste after it entered the plant.

In contrast, after all force mains and wet wells were aerated, the dissolved oxygen of received raw waste reached 3.4 p.p.m. The waste was treatable as indicated by its oxygen demand of more than 1.0 p.p.m. per hour. The dissolved oxygen content sufficed to sustain aerobic conditions throughout primary sedimentation. The effluent from this first stage of processing still exhibited a dissolved oxygen concentration exceeding 1.0 p.p.m. These results dramatically attest to the efficacy of these teachings of aeration. The desired suppression of odor from septic decomposition was a noticeable further result.

SYSTEM INTEGRATION

The arrangement of the overall units of FIG. 1 can function in waste treatment. One mode of operation is to allow all elements to float on line as the influent hydraulic and organic load changes. Typical changes in these two loads are high. In terms of an average daily load, the range may be as great as ±75% of the average load. Regulatory authorities usually stipulate that at no time shall prescribed limits for effluent quality be exceeded. With a highly variable input load, this means either that the process must be controlled to over treat waste most of the time, or that relating sophisticated control is necessary to achieve the necessary degree of treatment at any time. Both capital and operating expenses are lower in the latter case. However, the usual engineering unit tends toward the former technique. It is the approach and simplified controls and regulation to achieve a degree of treatment satisfactory for a fixed design condition. For any other input loading, effluent quality will vary.

Tests have shown that using the system with the sedimentation tank defined herein the DO level to the tank is about 2 to 3 p.p.m., and out of the tank about 1 to 1½ p.p.m. to definitely maintain the aerobic condition. This aerobic condition remains between 20 to 40 minutes after the effluent leaves the sedimentation tank.

While in accordance with the patent statutes only one best known embodiment of the invention has been described in detail, it is to be particularly understood that the invention is not limited thereto or thereby, but that the inventive scope is defined in the appended claims.

What is claimed is:

1. A system for pollution suppression for a raw sewage effluent which includes a primary sedimentation tank, a primary bioprocessing tank, and a primary disinfection tank, all of which operate with the influent under aerobic conditions, means to receive the raw waste influent at the input to the primary sedimentation tank and pass it throughout the system to the output of the disinfection tank wherein the primary sedimentation tank comprises a large cylindrical tank, a centrally positioned vertically extending influent well in the tank, means to pump the influent from the bottom of the well up through the top, a circularly shaped diffuser at the top of the influent well receiving the influent and discharging it therefrom at a full 360° therearound in a direction substantially tangential to the surface of the influent in the tank, means to maintain the influent level in the tank near the top edge thereof so that the influent discharge from the diffuser is substantially tangent to the top surface of the influent in the tank; the total input area to the diffuser from the influent well being equal to the total discharge area from the diffuser at the radially outer circumference thereof, the diffuser having a substantially horizontal upper surface and a hyperbolically shaped lower surface to extend in a smooth configuration from the top of the influent well to the discharge tip of the diffuser so that the influent pumped up through the well and through the diffuser will remain in a laminar flow condition, and at least one volute means positioned to surround the influent well, and below the diffuser, pump means associated with the volute to effect a circulation of the influent in the tank in a smooth laminar flow, and discharge the influent collected through the volute to the bioprocessing tank, and means to remove sludge from the bottom of the tank adjacent the bottom of the influent well, and means to control the flow of influent to and from the tank so that the flow therein remains substantially laminar at all times.

2. A system according to claim 1 where the control means include an inlet valve to control the amount of influent pumped by the pump means through the influent well, and valve means on the volute discharge by the volute pump means.

3. A system according to claim 2 where the cylindrical tank includes a cover and an overflow weir surrounding the top edge of the tank, and means to pass the influent from the overflow weir to the primary bioprocessing tank.

4. A system according to claim 3 where the primary sedimentation tank further includes sensor means positioned inside the tank to sense the amount of dissolved oxygen and organic load within the influent.

5. A system according to claim 4 where a screen is positioned between the discharge from the influent well and the diffuser to equalize the flow from the well through the diffuser and to collect grease and scum.

6. A system according to claim 5 which includes at least two volutes centrally positioned around the influent well, and means to selectively control the vertical height of the volutes within the tank, and each volute having a hyperbolically shaped lower surface of similar configuration to the lower surface of the diffuser to further enhance laminar flow of the influent into the volute to be discharged by the pump means.

7. A system according to claim 6 where the slope of the hyperbolical configuration of the volutes and the diffuser is about 7° and tapers to a substantially parallel configuration with the surface of the influent in the tank, and where the diffuser has a radial length of about one third the radius of the tank.

8. A waste water treatment system which comprises a primary bioprocessing tank, means to feed the waste water influent to the primary bioprocessing tank, a primary sedimentation tank, means to feed the influent from the primary bioprocessing tank to the primary sedimentation tank, means to inject an oxygen containing gas into the influent under high momentum exchange conditions in the inlet of the primary sedimentation tank, last said means including means to induce intense mixing sufficient to minimize radial concentration gradients of the gas in the influent, a digester, means to withdraw sludge from the primary sedimentation tank and feed it to the digester, a disinfection tank receiving the influent from the settling tank and discharging fully processed influent, and means for selectively injecting an oxygen containing gas under high momentum exchange conditions into the influent to maintain the influent throughout the entire system in an aerobic condition, last said means including means to induce intense mixing sufficient to minimize radial concentration gradients of the gas in the influent.

9. A system according to claim 8 which includes a recirculation line from the sedimentation tank to the input to the primary bioprocessing tank, and means to aerate the recirculation flow.

10. A system according to claim 9 which includes a secondary bioprocessing tank, and a secondary sedimentation tank to receive the influent from the secondary bioprocessing tank, means to recirculate the influent from any of the aforesaid tanks, and means to inject an oxygen containing gas under high momentum exchange conditions in the recirculations.

11. A system according to claim 10 which includes means to inject an oxygen containing gas under high momentum exchange conditions into the influent from the secondary sedimentation tank to induce intense mixing sufficient to minimize radial concentration gradients of the gas in the influent.

12. A two stage bioprocessing pollution suppression system for a raw sewage influent which comprises at least one primary sedimentation tank, said sedimentation tank operating under laminar flow conditions to provide sludge separation from the liquid influent with optimum efficiency;

at least one bioprocessing tank receiving the liquid influent from the sedimentation tank, means to insert an oxygen containing gas under high momentum exchange conditions to induce intense mixing sufficient to minimize radial concentration gradients of the gas in the liquid influent discharged from the sedimentation tank before influent enters the bioprocessing tank, a disinfection tank receiving the influent from the bioprocessing tank, which includes means to inject an ozone containing gas under high momentum exchange conditions into the influent during its traverse under a hydraulic pressure gradient through the disinfection tank whereby bacterial count in the influent is reduced to a desired degree, and means to inject sufficient oxygen containing gas under conditions of intense mixing sufficient to minimize radial concentration gradients of the gas in the influent during its flow whereby the influent remains aerobic throughout its traverse through the sedimentation tank, the bioprocessing tank and the disinfection tank.

13. A system according to claim 12 which includes means to selectively withdraw sludge from the sedimentation tank, means to recirculate the influent from the bioprocessing tank back to the sedimentation tank, and means to inject an oxygen containing gas under high momentum exchange, intense mixing conditions into the recirculated influent.

14. A system according to claim 12 which includes means to selectively withdraw sludge from the sedimentation tank, means to recirculate at least a portion of the influent from the bioprocessing tank to the sedimentation tank, and means to inject an oxygen containing gas under high momentum exchange conditions into the recirculated influent.

15. A system for pollution suppression for raw sewage influent which comprises, a sedimentation tank, means to inject raw waste into the tank for settling action, a bioprocessing tank, means to feed the influent from the sedimentation tank to the bioprocessing tank, and a disinfection tank receiving the influent from the sedimentation tank and discharging fully processed influent where the bioprocessing tank comprises a trickling filter which includes means to inject an oxygen containing gas into the influent before its injection into the trickling filter under a high momentum exchange condition to induce intense mixing sufficient to minimize radial concentration gradients of the gas throughout the influent entering the trickling filter.

16. A system according to claim 15 which includes a media of vertically extending tubing assembled in an equilateral triangular grid filling the trickling filter to maximize the surface installed per unit volume, said tubes being spaced to insure balanced flow inside and outside the tubes, each tube having a hydraulical radius for the internal and external passage being equal to define an area for biological plaques of about 40 ft.$^2$/ft.$^3$.

17. A system according to claim 16 which includes means to inject an oxygen containing gas in the trickling filter influent, and means to sense the DO concentrations within the influent in the trickling filter and control the amount of oxygen containing gas being added in accordance with the readings from the sensors.

18. A process to provide for pollution suppression in a waste system which comprises the steps of flowing raw waste influent into a settling tank under laminar flow conditions to effect separation of the liquid from the solid; withdrawing the liquid and solid separately from the settling tank and injecting an oxygen containing gas into the liquid influent under a high momentum exchange condition to induce intense mixing to minimize radial concentration gradients of the gas in influent, flowing the liquid over media in a trickling filter while maintaining an aerobic condition within the full depth of the filter, collecting the influent from the bottom of the filter, adding an ozone containing gas to the influent under high momentum exchange conditions until the desired degree of bacterial reduction is achieved while simultaneously flowing the fluid through a hydraulic pressure gradient, and which includes injecting an oxygen containing gas into the influent at various locations through its flow path to maintain the influent in an aerobic condition throughout the entire process, said oxygen containing injection being under a high momentum exchange condition to induce intense mixing to minimize radial concentration gradients of the gas in the liquid, and with the flow of the influent at the point of gas injection being at a Reynolds number greater than 3,000 and effecting further high momentum exchange intense mixing conditions within the influent downstream of the gas injection to maintain a uniform $O_2$ concentration without gradients within the influent.

19. A process according to claim 18 which includes selectively recirculating a portion of the influent from the trickling filter to the settling tank, removing sludge from the settling tank to a sludge digester system, and recirculating digester supernatant stabilized by injection of an oxygen containing gas under restricted turbulent exchange conditions, and extended residence time to the input of the settling tank.

20. A process according to claim 19 which includes providing a second filtering process on the influent from the trickling filter and providing a second sedimentation to the influent from the second filter, and recirculating influent from the second sedimentation process to the first filtering process, and where both filtering processes operate under aerobic conditions to maintain an area for biological plaques of about 40 feet squared per feet cubed.

21. A process according to claim 20 including providing system optimization by controlling the flow through the sedimentation tank and the trickling filter regardless of the amount of influent coming into the system to maintain substantially uniform hourly hydraulic and organic loading throughout a predetermined period of time.

22. A process according to claim 21 which includes maintaining the organic load concentration constant as the hydraulic load varies to maintain an average load condition over the predetermined period of time.

23. A process for pollution suppression of raw sewage influent in a sewage treatment system including at least one wet well, at least one sedimentation tank, and a force main with a centrifugal pump between the wet well and the sedimentation tank which comprises the steps of, (a) providing limited aeration of the influent in the wet well so as to avoid degassing in the centrifugal pump, and (b) aerating the influent in the force main inducing intense mixing to minimize radial concentration gradients of the gas in the influence sufficient to maintain the influent leaving the sedimentation tank in an aerobic condition.

24. A process according to claim 23 where the system further includes at least one primary bioprocessing tank, and at least one secondary sedimentation tank, each respectively connected to process the influent from the primary sedimentation tank, which includes the further steps of aerating the liquid influent under high momentum exchange conditions to induce intense mixing to minimize radial concentration gradients of the gas in the liquid, said aeration at sequential steps between primary sedimentation and primary bioprocessing and secondary sedimentation to maintain the influent in an aerobic condition throughout the process.

References Cited

UNITED STATES PATENTS

| | | | |
|---|---|---|---|
| 3,123,556 | 3/1964 | Gilbert | 210—151 |
| 2,809,933 | 10/1957 | Halvorson | 210—150 X |
| 3,617,537 | 11/1971 | Vermette | 210—8 |
| 3,296,122 | 1/1967 | Karassik et al. | 210—2 |
| 2,580,764 | 1/1952 | Gunz | 210—151 |
| 2,777,815 | 1/1957 | Forrest | 210—3 |
| 3,477,947 | 11/1969 | Kappe | 210—3 |
| 3,589,518 | 6/1971 | Brebion | 210—150 |
| 3,275,147 | 9/1966 | Gilde | 210—150 |
| 3,485,749 | 12/1969 | Reilly | 210—7 |
| 3,140,259 | 7/1964 | Kelly | 210—195 |

MICHAEL ROGERS, Primary Examiner

U.S. Cl. X.R.

210—8, 15, 18, 63, 96, 195, 202, 203, 220, 519